United States Patent
Gurney et al.

(10) Patent No.: US 8,261,329 B2
(45) Date of Patent: Sep. 4, 2012

(54) TRUST AND IDENTITY IN SECURE CALENDAR SHARING COLLABORATION

(75) Inventors: Daniel C. Gurney, Worcester, MA (US); Carol A Jones, Raleigh, NC (US); Anthony J Nadalin, Austin, TX (US); Nataraj Nagaratnam, Morrisville, NC (US); John J Rawls, San Marcos, TX (US); Robert L. Yates, Arlington, MA (US); Alfred Zollar, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 12/472,885

(22) Filed: May 27, 2009

(65) Prior Publication Data
US 2010/0306824 A1    Dec. 2, 2010

(51) Int. Cl.
*H04L 9/32* (2006.01)
(52) U.S. Cl. ............. 726/4; 726/28; 705/7.18; 705/7.19
(58) Field of Classification Search ................ 726/4, 28; 705/9; 707/E17.044
See application file for complete search history.

(56) References Cited

U.S. PATENT DOCUMENTS

| | | | |
|---|---|---|---|
| 7,797,732 B2* | 9/2010 | Tam et al. .................. | 726/3 |
| 7,881,233 B2* | 2/2011 | Bieselin .................... | 370/260 |
| 7,991,637 B1* | 8/2011 | Guiheneuf et al. ........ | 705/7.18 |
| 2006/0200374 A1 | 9/2006 | Nelken | |
| 2007/0106724 A1 | 5/2007 | Gorti et al. | |
| 2007/0265903 A1* | 11/2007 | Blair et al. ................ | 705/9 |
| 2008/0195705 A1* | 8/2008 | Lee ........................... | 709/204 |

FOREIGN PATENT DOCUMENTS

WO    2006092790 A2    9/2006

* cited by examiner

*Primary Examiner* — Haresh N Patel
*Assistant Examiner* — Mohammad Siddiqi
(74) *Attorney, Agent, or Firm* — Brevetto Law Group (57) ABSTRACT

In some embodiments, a system includes a database of trust information that internalizes security and trust relationships between a first entity and a second entity in regards to scheduling, and a central trust manager operable to determine from the database of trust information whether a trust relationship exists between a first organization and a second organization, the central trust manager also being operable to provide availability information of a user of the first organization to a second user of the second organization, the central trust manager also being operable to determine whether the second user of the second organization is granted access to requested calendar data and the central trust manager also being operable to provide the requested calendar data.

20 Claims, 7 Drawing Sheets

TRUST AND IDENTITY IN SECURE CALENDAR SHARING COLLABORATION

BACKGROUND

Social networking allows computer users to collaborate on projects. The collaboration improves the productivity of the users. One aspect of collaboration is scheduling activities and events between users. Schedules are typically maintained by calendar managers.

SUMMARY

According to an embodiment, a computer program product includes computer usable program code embodied on a computer usable medium, the computer usable program code configured to determine from a database of trust information whether a trust relationship exists between a first organization and a second organization, to provide availability information of a user associated with the first organization to a user associated with the second organization, to determine whether the user associated with the second organization will be granted access to requested schedule information of the user associated with the first organization based on security and identity information of the user that is associated with the second organization, and responsive to a positive determination, to provide the requested schedule information.

According to an embodiment, a method for securely managing calendar information across corporate boundaries includes providing a central trust management capability to manage the security and trust relationships between a plurality of corporate entities, responsive to a request for availability of a first user having a schedule maintained at a first calendar application maintained by a first corporate entity by a second user having a schedule maintained by a second calendar application maintained by a second corporate entity, determining whether a trust relationship exists between the first corporate entity and the second corporate entity, responsive to a positive determination of the existence of a trust relationship between the first corporate entity and the second corporate entity, providing availability information of the first user to the second user, responsive to a data request concerning/describing a scheduled meeting of the first user by the second user, accessing security and identity information of the second user, using the security and identity information of the second user according to a security policy to determine whether the second user is granted access to the requested information, and responsive to a positive determination that the second user is be granted access to the requested data, providing the requested information.

According to an embodiment, a method for securely managing calendar data across corporate boundaries includes transmitting a request for availability of a first user having a schedule maintained at a first calendar application maintained by a first corporate entity, the request transmitted by a second user having a schedule maintained by a second calendar application maintained by a second corporate entity, the request transmitted to a central trust management system that is operable to determine whether a trust relationship exists between the first corporate entity and the second corporate entity, receiving availability information of the first user, generating a request to schedule a meeting of the first user by the second user, the generating being performed from the availability information of the first user, transmitting to the central trust management system, the request to schedule a meeting of the first user by the second user, transmitting to the central trust management system, security and identity information of the second user, and receiving from the central trust management system, an indication of a meeting scheduled for the second user with the first user in accordance with the request to schedule a meeting.

According to an embodiment, a system includes a database of trust information that internalizes security and trust relationships between a first entity and a second entity in regards to scheduling, and a central trust manager operable to determine from the database of trust information whether a trust relationship exists between a first organization and a second organization, operable to provide availability information of a user of the first organization to a second user of the second organization, and operable to determine whether the second user of the second organization will be granted access to requested calendar data and operable to provide the requested calendar data.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
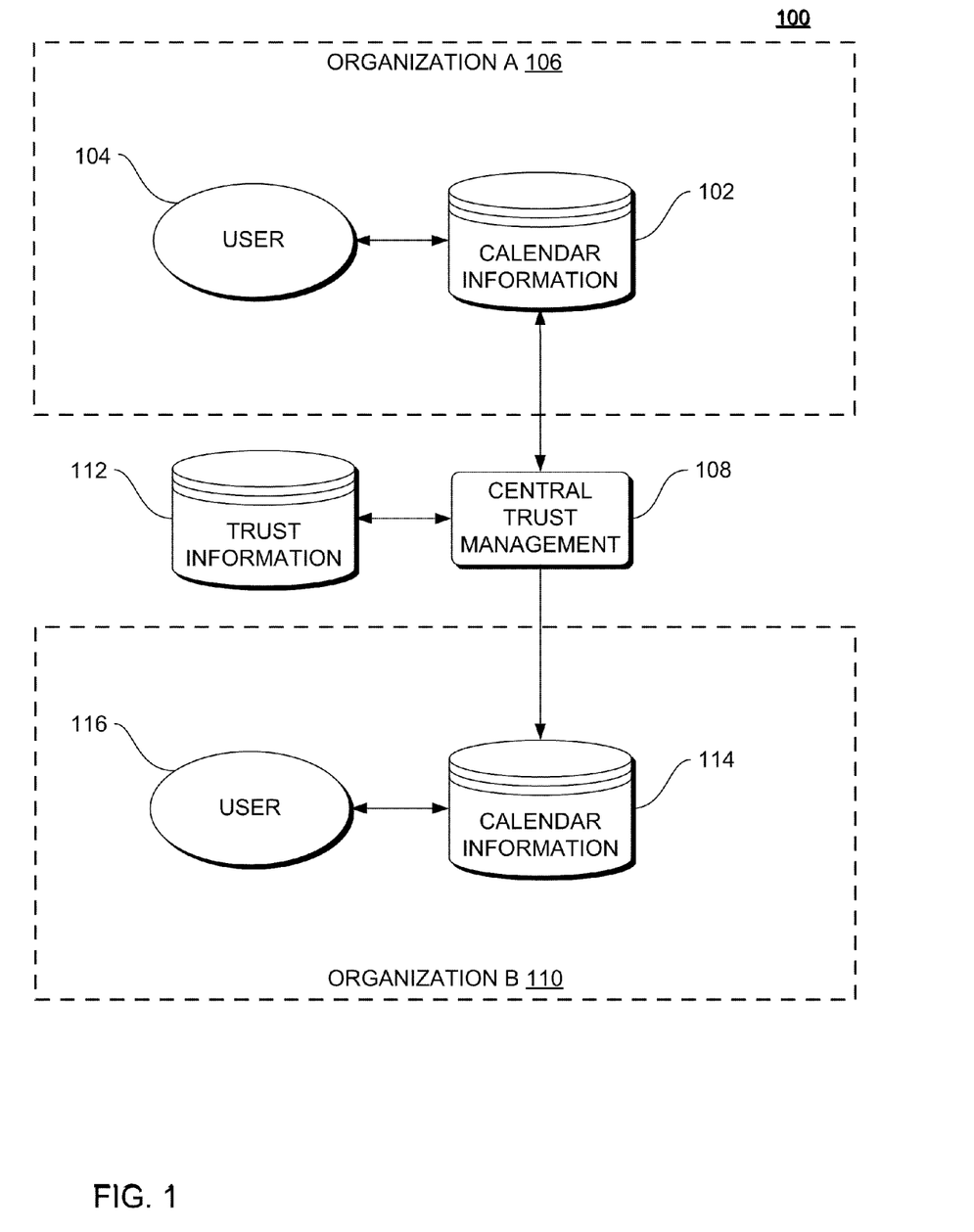
FIG. 1 depicts an embodiment of a system to securely manage calendar information across organizational boundaries.

With reference now to FIG. 1, a system 100 for securely managing calendar information across organizational boundaries is described. System 100 provides availability of a schedule of a user outside a corporate boundary or social community, the availability is provided within a secure context and within an extent of trust that exists between companies and that does not require all or any of the users to have accounts on the collaborative systems of the organizations.

System 100 includes a first database of calendar information 102 that is associated with a first user 104. The first calendar database 102 includes schedule information of the first user 104. In some embodiments, the schedule information includes a description of a date and a start-time of one or more event(s). The description of each event also includes a duration or an end-time of the event. The first calendar database 102 is managed, maintained and controlled by the first user 104 and also by a first organization, Organization "A" 106 and/or by the first user 104.

System 100 also includes a central trust management capability 108 that is operable to manage security and trust relationships between a plurality of entities, such as Organization "A" 106 and a second organization, Organization "B" 110. The central trust management capability 108 is a server or other component that is outside the sole control of either organizations 106 and 110. For example, in some implementations, the central trust management capability 108 is operated by a consortium of organizations, in which each of the subject member organizations, such as Organization "A" 106 and Organization "B" 110, have sole capability of specifying which other organizations or users are within a security and trust relationship of the subject member organization. The central trust management capability 108 provides security and collaboration of scheduling between calendars of users, such as user 104.

The central trust management 108 references a database of trust information 112 that describes and internalizes the security and trust relationship between the organizations 106 and 110 to determine whether a trust relationship exists between the organizations 106 and 110. For example, if user 104 trusts user 116 to access the calendar information 102, then user 104 is required to have a trust relationship with user 116. A trust relationship exists when trust is established between two or more parties, such as organizations 106 and 110. The trust relationship can be established digitally by a claim or credential issuing authority. Examples of a credential issuing authority include a certificate authority such as Verisign™, or another token issuing authority associated in some way with "organization B" 110. The trust relationship is based on identity, profile, and/or relationship information of the users, and does not require a password or account to establish trust. The description of the trust relationship acts as proxy or replacement for an account and/or password. The trust relationship is required in order to provide access to the calendar information 102 or permit actions on the calendar information 102 by user 116 at organization 110. One example of such an action is the user 116 scheduling a time block in the calendar 102 from an invitation request of user 116. In some situations, even though a trust relationship exists between organization 106 and organization 110, acceptance by user 104 of the request is required to perform the scheduling. Without some extent of trust that is presented by the database of trust information 112, organizations are not readily willing to share calendar information and provide scheduling of calendar information because of privacy and confidentiality issues. However, the database of trust information 112 provides information indicating that access and actions on calendar information 102 by user 116 is trustworthy.

In some embodiments, the database of trust information 112 describes the security and trust relationship of portions of the organizations 106 and 110 down to certain specific gradations, such as down to a division level within the organization, a group level within the organization, down to a department level with the organization, or down to a level of each individual person within the organization. Thus, depending upon the exact specific organizational level that trust relationships are described by the database 112, the central trust management capability 108 can manage security and trust relationship between a plurality of entities at the specific level with the organizations. In some embodiments, the scope of the trust that the central trust management capability 108 is authorization which is a specific permission or approval in regards to access to the first database of calendar information 102. A trust relationship can be limited to particular specific application programs, but in other situations, the description of the trust relationship can be applicable to all application programs or a group or type of application program, such as a Java® Applet.

Organization "B" 110 of system 100 also includes a second database of calendar information 114 that is associated with a second user 116. The second calendar database includes schedule information of the second user 116. In some embodiments, the schedule information includes a description of a date and a start-time of one or more event(s). The description of each event also includes a duration or an end-time of the event. The second calendar database 114 is managed, maintained and controlled by the second user 116 and also by a second organization "Organization "B"" 110 and/or by the second user 116. Each of the first calendar database 102, the trust information database 112 and the first calendar database 114 can be a structured collection of calendar data. The structure is achieved by organizing the calendar data according to a database model, such as the relational model, the hierarchical model or the network model. The databases can be accessed by a database management system (DBMS) that is not shown in FIG. 1. Example of a DBMS include DB2®, LDAP® systems such as IBM Tivoli® Directory Server™ or Active Directory™, or even some other web service.

In system 100, each user that intends to avail themselves of the centralized trust management 108 can store credentials of each of the users on the centralized trust management 108. The centralized trust management 108 securely stores the credentials of the user. The centralized trust management 108 also stores the trust requirements for each user that describe the credentials that are required of other users to access information associated with each user through the centralized trust management 108. In some embodiments, the required trust credentials are described in terms of business logic of the parameters and scope of trusted users. In some embodiments a user credentials in the required trust credentials are described based on open standards, such as WS-Trust and Project Higgins. WS-Trust specifies issuance, renewal, and validation of security tokens, as well as establishment, assessment of the presence of broker trust relationships between participants in a secure message exchange. WS-Trust is published by the Organization for the Advancement of Structured Information Standards (OASIS) located at 630 Boston Road, Suite M-102, Billerica, Mass. 01821. Project Higgins provides a software framework that enables users and applications to integrate identity, profile, and relationship information across multiple data sources and protocols using Information Cards that store personal information of a user. The specification for Project Higgins is published by the Eclipse Foundation, Inc. that is located at 102 Centrepointe Drive, Ottawa, Ontario, Canada, K2G 6B1.

Calendar scheduling can include two aspects: (a) FreeBusy Time and (b) Calendar information sharing. In (a) FreeBusy Time calendering-free or busy blocks at a given day/time that can facilitate scheduling calendars. FreeBusy Time could be considered 'coarse grained' access to calendar information. To support management of FreeBusy Time scheduling calendar management, the central trust management capability 108 manages security outside the calendar applications of the users. For example, the central trust management capability 108 manages trust between organizations at an inter-organizational level. Some organizations use proprietary approaches to security and trust, in which case, the central trust management capability 108 requires a different account for each of the different proprietary approaches, but nonetheless the central trust management capability 108 manages trust outside of the calendar managers of the users. Widespread use of the central trust management capability 108 could result in less use of proprietary approaches to security and trust, which, which would increase use of standardized protocols and security tokens, in which case the need for users to have different accounts on all communities will diminish.

In (b) Calendar information sharing—given the busy schedule of working individuals, and work-life balance, many times people have to shuffle business appointments of the people to attend high priority family or social events, or vice versa. In order to make those priority decisions at real time, obtaining details of the subject of the currently scheduled appointment is helpful in prioritizing and rearranging schedules. To support calendar information sharing, system 100 includes user identity information in a message format, such as CalAtom, so that security is included in the request/response of calendar information 102 and/or 114. Thus, only authorized messages are allowed to pass through and access calendar information based on security policies. The specification of CalAtom is published by Rob Yates and Dan Gurney in CalAtom, Using the Atom Publishing Protocol for Calendaring, Version 0.9, May 17, 2006. CalAtom can be considered an Extensible Markup Language (XML) wrapper for iCalendar information that adheres to the Atom Syndication and Atom Publishing standards that that are published in RFC 4287 and RFC 5023, respectively, by the Internet Engineering Task Force (IETF) at 1775 Wiehle Ave., Suite 102, Reston, Va. 20190

System 100 provides secure collaboration between organizations. For example, where one of the organizations is a corporation, and another organization is a consumer community, system 100 provides secure collaboration between the corporate organization and the consumer community.

In some embodiments, the central trust management 108 and/or user 104 access the calendar information 102 through a calendar application (not shown). Similarly, in some embodiments, the central trust management 108 and/or user 116 access the calendar information 114 through a calendar application (not shown).

In conventional systems, each user (e.g. user 104 and user 116) is required to have accounts on both systems (e.g., one in a network domain of a first corporation and one in a network domain of a second corporation) in order to search for or access information on employees of the first corporation, and the second corporation members respectively. Method 100 provides a secure infrastructure in sharing calendar information between organizations that does not require passwords. When a user intends to schedule an appointment with a user at a different organization, the user sends a request through an application program on a client computer of the user, to a central trust repository, to determine whether or not the scheduling/calendaring action that the user intends is within a scope of trust between the two users. Passwords are not involved; a password is not associated with the organizations. Providing access to the scheduling/calendaring information based on trust provides strong security to calendaring applications, and reduces security breaches and unscrupulous use of the calendar data, without the inconvenience of requiring passwords.

In system 100, the users 104 and 116 and the organizations 106 and 110 need maintain direct communication with only the central trust management capability 108. The users 104 and 116 and the organizations 106 and 110 need not maintain direct communication with each other. Thus, both the users and the organizations enjoy a similar benefit from system 100 in which the users do not need to maintain a multiplicity and plethora of accounts and/or passwords on the computer systems of the organizations. This is an important benefit because in comparison to conventional systems, the greater the number of users and organizations that are involved, the greater the synergies and efficiencies that system 100 provides because in situations that have a large number of users and organizations, for each user and organization that is added to the situation, the number of accounts and/or accounts increases exponentially, thus the number of accounts and/or passwords that exist for each user on each system is quite large. System 100 reduces the exponential increases complexity in managing trust between users of different organizations because all relationships between the users are managed by the central trust management capability 108.

Figure 2:
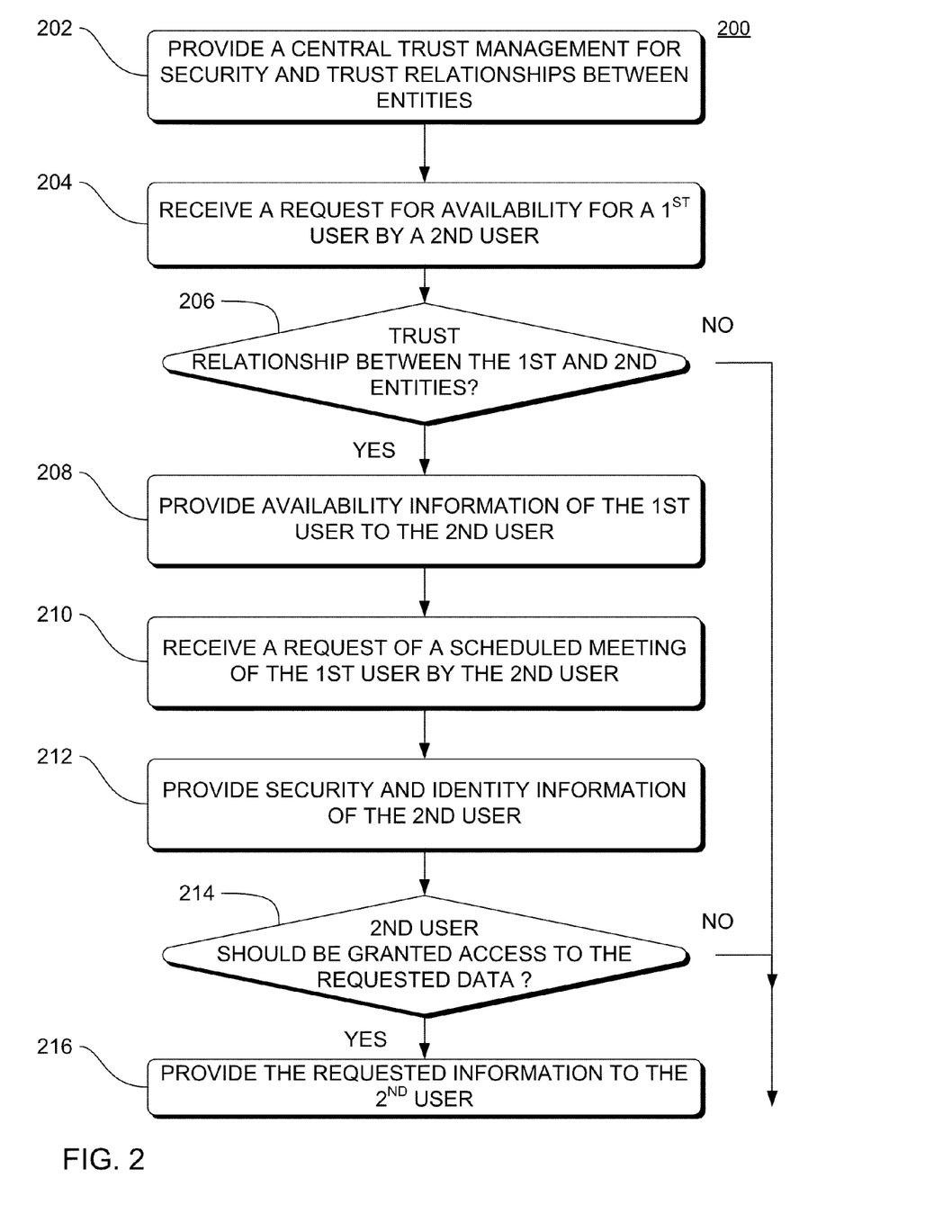
FIG. 2 depicts an embodiment of a method to securely manage calendar information across organizational boundaries by a server.

With reference now to FIG. 2, a method 200 for securely managing calendar information across organizational boundaries by a server is described. Method 200 provides secure collaboration between organizations. For example, where one of the organizations is a corporation, and another organization is a consumer community, method 200 provides secure collaboration between the corporate organization and the consumer community. Method 200 can be performed by the central trust management capability 108 in FIG. 1, in which the central trust management capability 108 is operated by a consortium of organizations, wherein each of the subject member organizations have sole capability of specifying which other organizations or users are within a security and trust relationship of the subject member organization.

Method 200 may include providing a central trust management, at block 202. The central trust management capability manages security and trust relationships between a plurality of organizations. The providing action at block 202 can include operating the central trust management capability and making the central trust management capability accessible to organizations over the Internet or other network. In some implementations, either of the organizations are entities such as corporate entities or non-profit entities.

Method 200 may also include receiving a request for availability of a first user, at block 202. The request is made by or on behalf of a second user. More specifically, the request is a request to schedule the second user on the schedule of the first user. In some embodiments, the availability of the first user is an available time block of the first user. In some embodiments, the available time block is a description of a start-time, a date; and a duration or an end-time of a scheduled event of the first user. The first user has a schedule maintained at a first calendar application maintained by a first corporate entity. The second user has a schedule maintained by a second calendar application maintained by a second corporate entity. One example of the first user in method 200 is user 104 and one example of the second user in method 200 is user 116 in FIG. 1.

Method 200 also may include determining whether or not a trust relationship exists between the first corporate entity and the second corporate entity, at block 206. Existence of a trust relationship can be determined by evaluating a digital claim, security token and/or certificate of a requesting user. For example, a trust relationship can be determined to exist if a user (e.g. user 116) requesting access is identified as a trusted user from a digital claim, security token and/or certificate presented by the user (e.g. user 116) when requesting access to a calendar (e.g. calendar 102) of the owner (e.g. user 104). The requesting user can be identified as a trusted user by determining that the digital claim, security token and/or certificate of the requesting user is issued by an authority that the calendar owner (e.g. user 104) trusts and by also validating the authenticity of the digital claim, security token and/or certificate of the requesting user with the issuer of the digital claim, security token and/or certificate. Determination of the trust relationship may be performed by determining whether or not the requesting user (e.g. user 116) is authorized by calendar owner (e.g. user 104) to access the requested data or database of calendar information 102 in accordance with users' policy (e.g. user 104.

If there is not trust relationship, the request for availability of the first user can not and will not be honored. The remainder of method 200 is predicated upon the existence of a trust relationship between the first corporate entity and the second corporate entity. If no trust relationship exists between the first corporate entity and the second corporate entity, then performance of method 200 ends. In some embodiments, a scope, depth and breadth of the trust relationship between the first corporate entity and the second corporate entity is determined at block 206 and the determining at block 206 includes determining whether or not the trust relationship meets a least a certain minimum measure or extent of trust.

After a sufficient trust relationship is determined to exist between the organizations of the first user and the second user, method 200 may also include providing availability information of the first user to the second user, at block 208. The availability information that is provided at block 208 is in accordance with the request at block 204. In some embodiments, the scope of the availability information is no greater and no less than the scope of the availability information that was requested in block 204. In other embodiments, the scope of the availability information is in accordance with the scope of the trust relationship that was determined at block 206 which is no greater and no less than the scope of the trust relationship that was determined at block 206.

Method 200 may also include receiving a data request concerning and/or describing a scheduled meeting of the first user by the second user, at block 210. The request can be received from the second user, in a situation where the second user initiates the request.

Method 200 may also include accessing security and identity information of the second user at block 212 and thereafter, using the security and identity information of the second user to determine whether or not to grant access to the second user to the requested information, at block 214. The security and identity information can be a software security token or digital signature, either of which includes an identification of the user. The determination to grant access at block 214 may be made in reference to the identity of the user. The determination to grant access at block 214 is not made in reference to a password. In one example, the "security information" of the second user can be a credential that identifies the second user, such as a security token issued by trusted authority. In another example, the "security information" of the second user can be information describing the second user's direct or indirect relationship to the first user; for example, where the second user is a financial advisor, a physician, spouse or other trusted agent of the first user or a company of the first user. In some embodiments, the determining at block 214 is performed according to a security policy. If the second user is not granted access to the requested information, then performance of method 200 ends.

Method 200 may also include providing the requested information, at block 216, if the second user is granted access to the requested information at block 214. Upon performance at block 216, the second user will receive schedule information of a meeting with the first user.

Method 200 provides a capability to create an event on the schedule of the first user at the request of the second user, in which the second user is not a part of the organization of the first user, and in which the event is created only when a trust of sufficient extent exists between the organization of the first user and the organization of the second user, without a requirement that all or any of the users have accounts and/or passwords on computer systems of the organizations. The absence of a requirement of an account on either of the computer systems of the users decreases the administrative burden on the users in maintaining accounts on the computers system of the other users. This aspect is particularly helpful in situations where the number of organizations is large. Rather than each individual organization having to maintain accounts and passwords for each user, the central trust management that is provided in block 202 performs all the actions required in method 200 to manage access of schedules of the users, thus each individual organization does not need to maintain accounts and/or password for each of the user.

Figure 3:
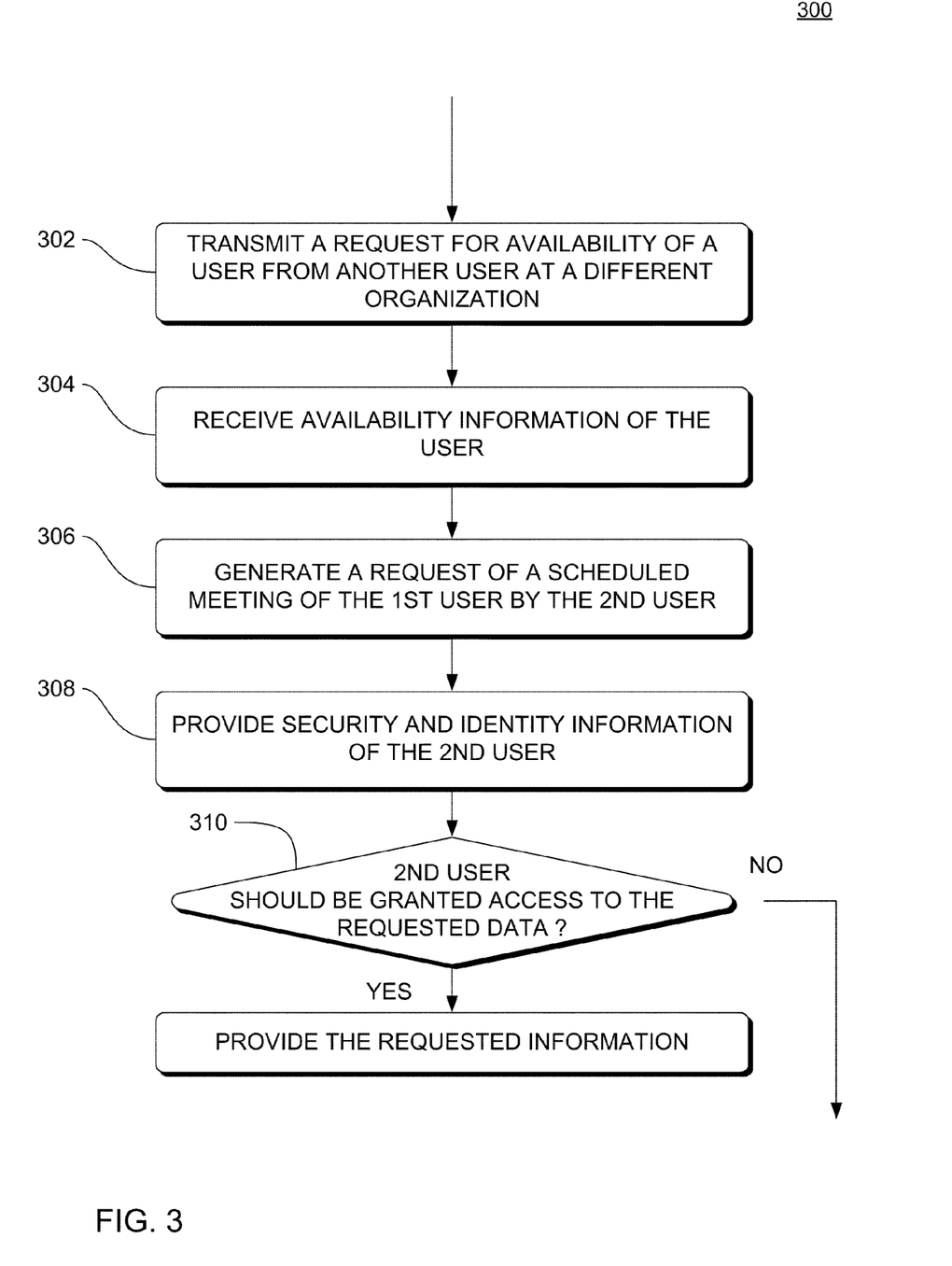
FIG. 3 depicts an embodiment of a method to securely manage calendar information across organizational boundaries by a client.

With reference now to FIG. 3, a method 300 for securely managing calendar information across corporate boundaries by a client is described. Method 300 provides a facility through which a user, a first user in particular, can be scheduled for an event with another user, a second user in particular, and the request can be accomplished through a central trust management system without any interaction from the first user according to trust parameters that have been established beforehand between the organizations with which the users are associated. One example of the first user in method 300 is user 104 and one example of the second user in method 300 is user 116 in FIG. 1.

Method 300 may include transmitting a request for availability of the first user, at block 302. The first user has a schedule maintained at a first calendar application maintained by a first corporate entity, or other entity. The request is transmitted by a second user having a schedule maintained by a second calendar application maintained by a second corporate entity. The request is transmitted to a central trust management system, such as central trust management 108 in FIG. 1. The central trust management is operable to determine whether a trust relationship exists between the first corporate entity, such as Organization "A" 106 and the second corporate entity, such as Organization "B" 110.

Method 300 also includes receiving the requested availability information of the first user, at block 304. The availability information can be either FreeBusy Time or Calendar information sharing and the event information can be in XML or any other agreed-upon textual format, such as iCalendar format for calendar data exchange that is published in RFC 2445 by the Internet Engineering Task Force (IETF) at 1775 Wiehle Ave., Suite 102, Reston, Va. 20190.

Method 300 may also include generating a request to schedule a meeting of the first user by the second user, at block 306. The request is generated from the availability information of the first user. Thereafter, method 300 includes transmitting the request to schedule a meeting to the central trust management system.

Method 300 may also include transmitting to the central trust management system, security and identity information of the second user, at block 308.

Method 300 may also include receiving an indication of a meeting scheduled for the second user with the first user. The meeting scheduled for the second user with the first user is an event scheduled on the calendar of the first user in which the second user is identified as a participant in the meeting. The event information can be either FreeBusy Time or Calendar information sharing and the event information can be in XML or any other agreed-upon textual format, such as iCalendar format. The scheduled meeting indication can be a file in xCal format for calendar data exchange which is an XML-compliant (Extensible Markup Language) representation of the iCalendar standard. In some embodiments, the scheduled meeting is in accord with the request to schedule a meeting in which the scheduled meeting indication specifies the same date, time and duration as in the request. The scheduled meeting indication can be received from the central trust management system.

Method 300 does not require passwords to share calendar information between organizations. When a user intends to schedule an appointment with a user at a different organization, the user sends a request through an application program on a client computer of the user, to a central trust repository that determines whether or not the scheduling/calendaring action that the user intends is within a scope of trust that has been established beforehand between the organizations. Passwords are not involved. Providing access to the scheduling/ calendaring information of the second user based on trust provides strong security to calendaring applications, and reduces security breaches and unscrupulous use of the calendar data, without the inconvenience of requiring passwords.

Figure 4:
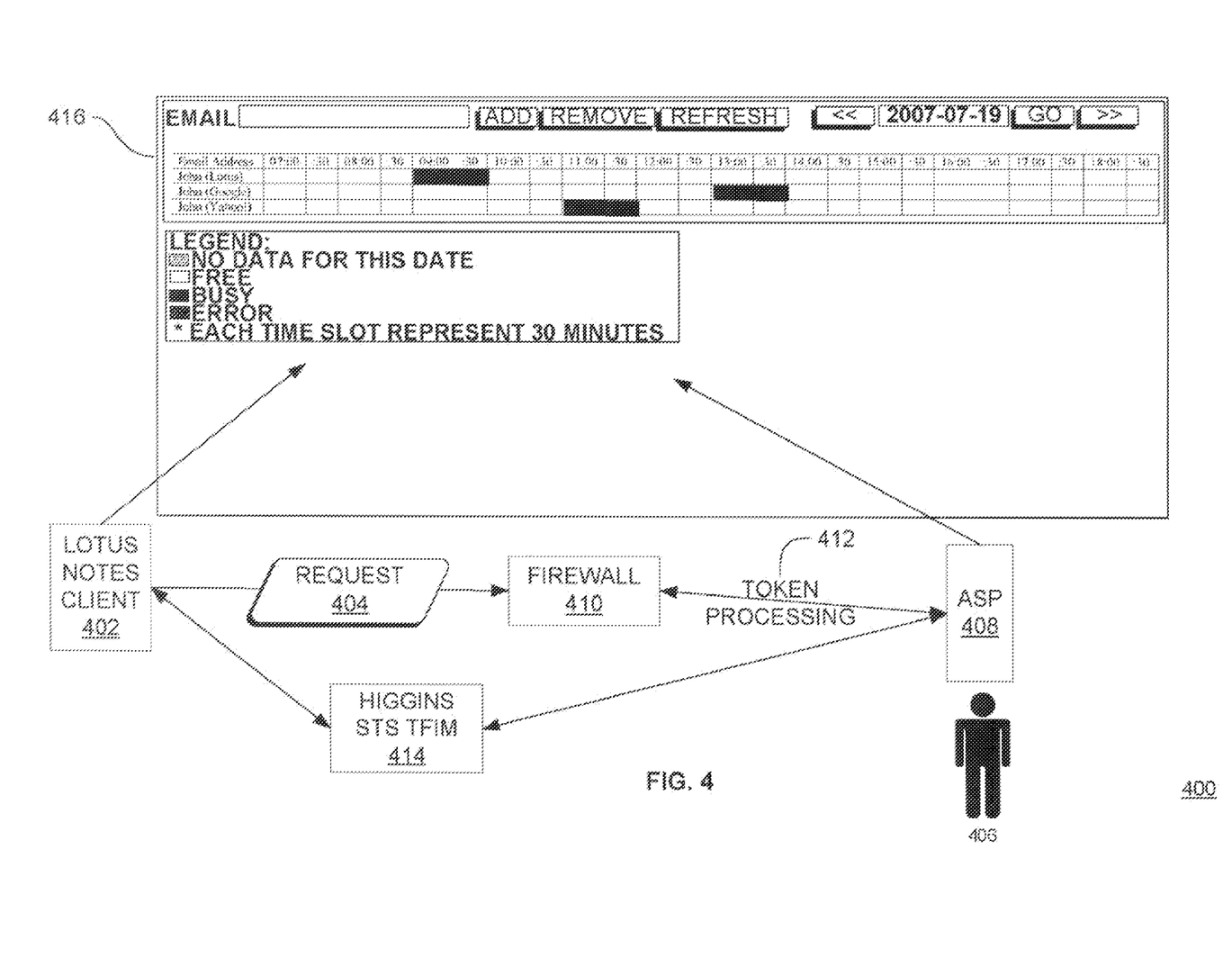
FIG. 4 depicts an embodiment of a system to securely share calendar information of FreeBusy time across consumer-corporate communities.

With reference now to FIG. 4, a system 400 for securely sharing calendar information of FreeBusy time across consumer-corporate communities is described. In system 400 client computer 402 generates and transmits a request 404 for free/busy time of a user 406 associated with an application service provider (ASP) 408. In some implementations, client computer 402 executes Lotus Notes®.

The request 404 includes a token for the ASP 408. The token can be similar to the token in method 200 such as a software security token or a digital signature. The request 404 is transmitted through a firewall 410. Between the firewall 410 and the ASP 408, the token is processed 412 by validating the token to verify that the token is issued by a trusted authority and if validation is successful, then inserting an e-mail identifier based on trust management policy-based control into the token. Thereafter the ASP 408 transmits authentication information to a security token service (STS) 414. In some implementation, the STS 414 implements software components from the Project Higgins. Thereafter, the client 402 receives a token from the ASP 408 through the STS 414 in exchange for a Domino® token that is sent from the client 402 through the STS 414 to the ASP 408. Thereupon, the requested Free/busy time calendar information 416 is transmitted from the ASP 408 to the client 402. System 400 uses no accounts and/or password to provide the requested Free/busy time calendar information 416 of the user 406 from ASP 408 to the client computer 402.

Figure 5:
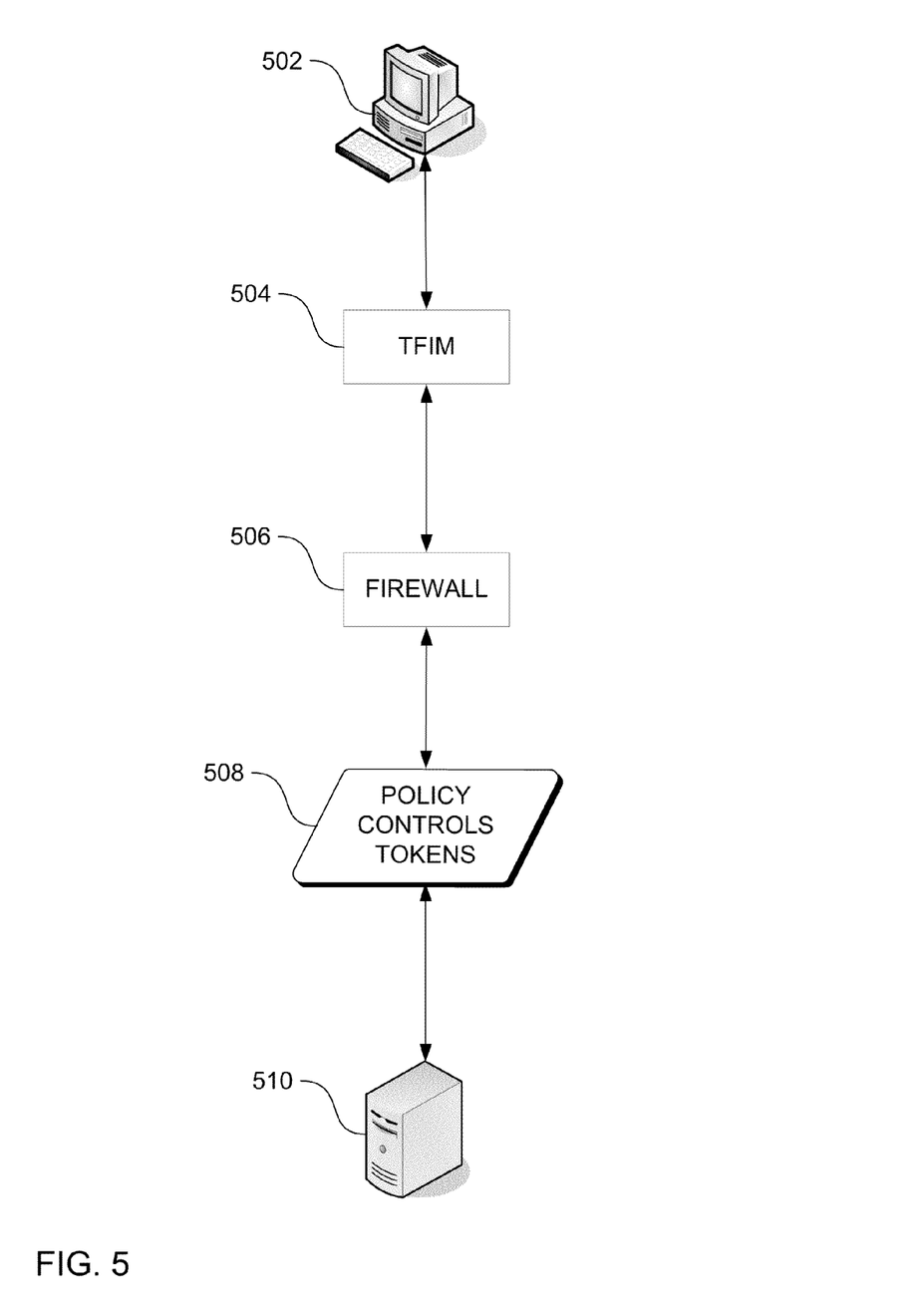
FIG. 5 depicts an embodiment of a system to securely share calendar information of FreeBusy time across consumer-corporate communities.

With reference now to FIG. 5, a system 500 for securely sharing calendar information of FreeBusy time across consumer-corporate communities is described. In system 500 a client computer 502 transmits a request for calendar data to a security token service (STS) 504. The STS 504 transmits the request to a firewall 506 and thereafter, policy controls and tokens 508 that would assert the trusted relationship in regards to the request are exchanged with the application service program (ASP) 510, and thereafter the requested calendar data is transmitted from the ASP 510, to the client computer 502 though the firewall 506 and the STS 504. System 500 uses no accounts and/or password to provide the requested calendar data from ASP 510 to the client computer 502.

Figure 6:
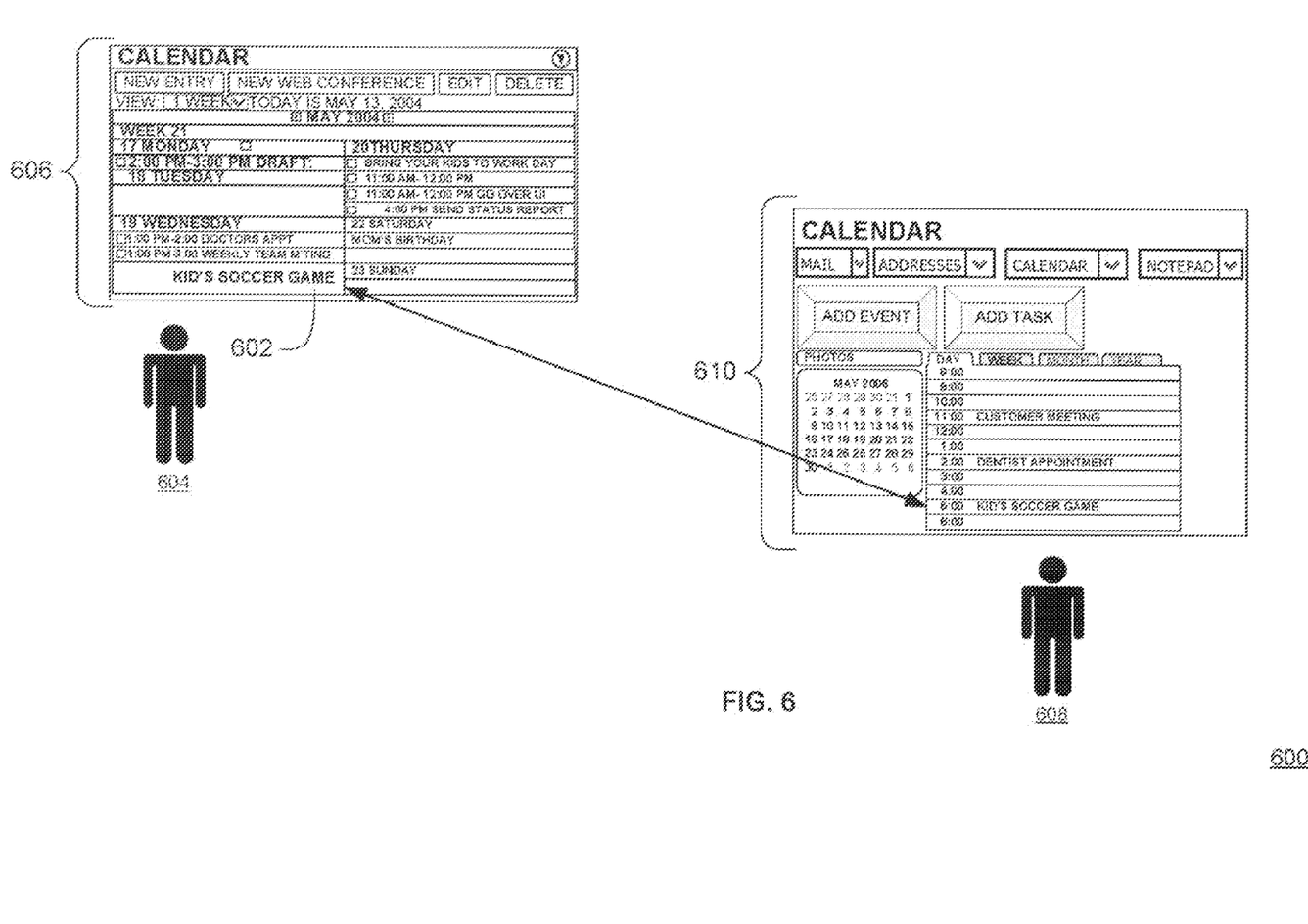
FIG. 6 depicts an embodiment of shared calendar information across consumer-corporate communities.

With reference now to FIG. 6, an example of shared calendar information across consumer-corporate communities is described. In FIG. 6, performance of method 100, 200 or 300 results in an appointment 602 that is shared between users of two separate organizations. The appointment 602 is stored in the calendar manager of the first user 604 and is viewed in the graphic user interface (GUI) 606 of that calendar manager. The appointment 602 is also stored in the calendar manager of a second user 608 and is viewed in the graphic user interface (GUI) 610 of that calendar manager.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
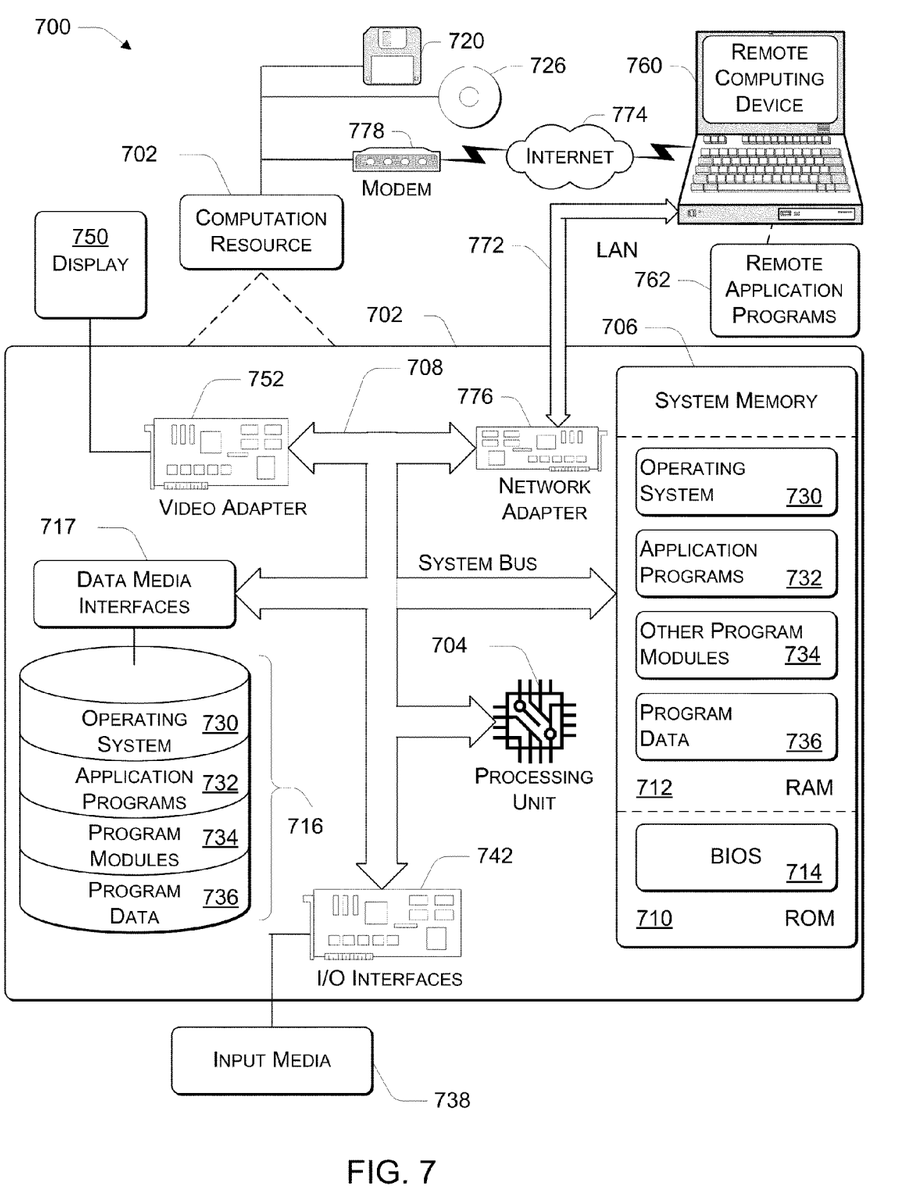
FIG. 7 depicts an embodiment of a general computer environment that may be used in connection with the method described in FIG. 1-3, the systems described in FIG. 4-5, and the graphical user interfaces of FIG. 6.

With reference now to FIG. 7, is an example of a general computer environment 700, in accordance with an embodiment of the disclosed subject matter. The general computer environment 700 includes a computation resource 702 capable of implementing the processes described herein. It will be appreciated that other devices can alternatively used that include more components, or fewer components, than those illustrated in FIG. 7.

The illustrated operating environment 700 is only one example of a suitable operating environment, and the example described with reference to FIG. 7 is not intended to suggest any limitation as to the scope of use or functionality of the embodiments of this disclosure. Other well-known computing systems, environments, and/or configurations can be suitable for implementation and/or application of the subject matter disclosed herein.

The computation resource 702 includes one or more processors or processing units 704, a system memory 706, and a bus 708 that couples various system components including the system memory 706 to processor(s) 704 and other elements in the environment 700. The bus 708 represents one or more of any of several types of bus structures, including a memory bus or memory controller, a peripheral bus, an accelerated graphics port and a processor or local bus using any of a variety of bus architectures, and can be compatible with SCSI (small computer system interconnect), or other conventional bus architectures and protocols.

The system memory 706 includes nonvolatile read-only memory (ROM) 710 and random access memory (RAM) 712, which can or cannot include volatile memory elements. A basic input/output system (BIOS) 714, containing the elementary routines that help to transfer information between elements within computation resource 702 and with external items, typically invoked into operating memory during start-up, is stored in ROM 710.

The computation resource 702 further can include a non-volatile read/write memory 716, represented in FIG. 7 as a hard disk drive, coupled to bus 708 via a data media interface 717 (e.g., a SCSI, ATA, or other type of interface); a magnetic disk drive (not shown) for reading from, and/or writing to, a removable magnetic disk 720 and an optical disk drive (not shown) for reading from, and/or writing to, a removable optical disk 726 such as a CD, DVD, or other optical media.

The non-volatile read/write memory 716 and associated computer-readable media provide nonvolatile storage of computer-readable instructions, data structures, program modules and other data for the computation resource 702. Although the exemplary environment 700 is described herein as employing a non-volatile read/write memory 716, a removable magnetic disk 720 and a removable optical disk 726, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the nonvolatile read/write memory 716, magnetic disk 720, optical disk 726, ROM 710, or RAM 712, including an operating system 730, one or more application programs 732, other program modules 734 and program data 736. Examples of computer operating systems conventionally employed include the LINUX® operating system, and others, for example, providing capability for supporting application programs 732 using, for example, code modules written in the C++® computer programming language.

A user can enter commands and information into computation resource 702 through input devices such as input media 738 (e.g., keyboard/keypad, tactile input or pointing device, mouse, foot-operated switching apparatus, joystick, touchscreen or touchpad, microphone, antenna etc.). Such input devices 738 are coupled to the processing unit 704 through a conventional input/output interface 742 that is, in turn, coupled to the system bus. A monitor 750 or other type of display device is also coupled to the system bus 708 via an interface, such as a video adapter 752.

The computation resource 702 can include capability for operating in a networked environment using logical connections to one or more remote computers, such as a remote computer 760. The remote computer 760 can be a personal computer, a server, a router, a network PC, a peer device or other common network node, and typically includes many or all of the elements described above relative to the computation resource 702. In a networked environment, program modules depicted relative to the computation resource 702, or portions thereof, can be stored in a remote memory storage device such as can be associated with the remote computer 760. By way of example, remote application programs 762 reside on a memory device of the remote computer 760. The logical connections represented in FIG. 7 can include interface capabilities, e.g., such as interface capabilities 1452 (FIG. 14) a storage area network (SAN, not illustrated in FIG. 7), local area network (LAN) 772 and/or a wide area network (WAN) 774, but can also include other networks.

Such networking environments are commonplace in modern computer systems, and in association with intranets and the Internet. In certain embodiments, the computation resource 702 executes an Internet Web browser program (which can optionally be integrated into the operating system 730), such as the "Internet Explorer®" Web browser manufactured and distributed by the Microsoft Corporation of Redmond, Wash.

When used in a LAN-coupled environment, the computation resource 702 communicates with or through the local area network 772 via a network interface or adapter 776. When used in a WAN-coupled environment, the computation resource 702 typically includes interfaces, such as a modem 778, or other apparatus, for establishing communications with or through the WAN 774, such as the Internet. The modem 778, which can be internal or external, is coupled to the system bus 708 via a serial port interface.

In a networked environment, program modules depicted relative to the computation resource 702, or portions thereof, can be stored in remote memory apparatus. It will be appreciated that the network connections shown are exemplary, and other means of establishing a communications link between various computer systems and elements can be used.

A user of a computer can operate in a networked environment 1400 using logical connections to one or more remote computers, such as a remote computer 760, which can be a personal computer, a server, a router, a network PC, a peer device or other common network node. Typically, a remote computer 760 includes many or all of the elements described above relative to the computer 700 of FIG. 7.

The computation resource 702 typically includes at least some form of computer-readable media. Computer-readable media can be any available media that can be accessed by the computation resource 702. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 702.

Communication media typically embodies computer-readable instructions, data structures, program modules or other data, represented via, and determinable from, a modulated data signal, such as a carrier wave or other transport mechanism, and includes any information delivery media. The term "modulated data signal" means a signal that has one or more of its characteristics set or changed in such a manner as to encode information in the signal in a fashion amenable to computer interpretation.

By way of example, and not limitation, communication media include wired media, such as wired network or direct-wired connections, and wireless media, such as acoustic, RF, infrared and other wireless media. The scope of the term computer-readable media includes combinations of any of the above.

We claim:

1. A method for securely managing calendar information across corporate boundaries, the method comprising:
    providing a central trust management capability to manage security and trust relationships between a plurality of corporate entities;
    responsive to a request for availability of a first user having a schedule maintained at a first calendar application maintained on a first computer of a first corporate entity by a second user having a schedule maintained by a second calendar application maintained on a second computer of a second corporate entity, determining whether a trust relationship exists between the first corporate entity and the second corporate entity;
    responsive to a positive determination by the central trust management capability of the existence of a trust relationship between the first corporate entity and the second corporate entity, providing availability information of the first user to the second user;
    responsive to a data request concerning a scheduled meeting of the first user by the second user, accessing security and identity information of the second user;
    using the security and identity information of the second user according to a security policy to determine whether the second user is granted access to the requested information; and
    responsive to a positive determination that the second user is granted access to the requested data, providing the requested information;

wherein the central trust management capability comprises an application maintained on a third computer that includes a database of trust information characterizing security and trust relationships between the first corporate entity and the second corporate entity.

2. The method of claim 1, wherein the availability of the first user further comprises:
an available time block of the first user.

3. The method of claim 1, wherein the availability of the first user further comprises:
a description start-time, a date, and a duration of a scheduled event of the first user.

4. The method of claim 1, wherein the central trust management capability further comprises:
a central authentication and authorization capability.

5. The method of claim 1, wherein the central trust management capability that is operable to determine whether a trust relationship exists between the first corporate entity and the second corporate entity further comprises:
a central trust management capability that is operable to determine whether a trust relationship exists between the first corporate entity and a portion of the second corporate entity associated with the second user.

6. The method of claim 1, wherein the central trust management capability that is operable to determine whether a trust relationship exists between the first corporate entity and the second corporate entity further comprises:
a central trust management capability that is operable to determine whether a trust relationship exists between a portion of the first corporate entity associated with the first user and the second corporate entity.

7. The method of claim 1, wherein the central trust management capability further comprises:
a password that fails to be associated with the first user; and
a password that fails to be associated with the second user.

8. A computer program product including central trust management capability to manage security and trust relationships between a plurality of corporate entities, the computer program product comprising:
a non-transitory computer usable medium having computer usable program code embodied therewith, the computer usable program code comprising:
computer usable program code configured to:
responsive to a request for availability of a first user having a schedule maintained at a first calendar application maintained on a first computer of a first organization by a second user having a schedule maintained by a second calendar application maintained on a second computer of a second organization, determine from a database of trust information whether a trust relationship exists between the first organization and the second organization;
responsive to a positive determination by the central trust management capability of the existence of a trust relationship between the first organization and the second organization, provide availability information of the first user associated with the first organization to the second user associated with the second organization;
responsive to a data request concerning a scheduled meeting of the first user by the second user, accessing security and identity information of the second user;
determine whether the second user associated with the second organization is granted access to requested schedule information of the first user associated with the first organization based on security and identity information of the second user that is associated with the second organization; and
responsive to a positive determination that the second user is granted access to the requested data, provide the requested schedule information;
wherein the central trust management capability comprises an application maintained on a third computer that includes a database of trust information characterizing security and trust relationships between the first corporate entity and the second corporate entity.

9. The computer program product of claim 8, wherein the computer usable program code configured to determine from the database of trust information whether a trust relationship exists between the first organization and the second organization the computer usable program code being further configured to:
determine from the database of trust information whether a trust relationship exists between a portion of the first organization and a portion of the second organization.

10. The computer program product of claim 8, wherein the computer usable program code configured to determine whether the second user associated with the second organization is granted access to requested schedule information of the first user associated with the first organization based on security and identity information of the second user that is associated with the second organization, the computer usable program code being further configured to:
determine whether the second user associated with the second organization within a scope of trust of the requested schedule information of the first user associated with the first organization based on a security token of the second user that is associated with the second organization.

11. The computer program product of claim 8, wherein the database of trust information further comprises:
a password that fails to be associated with the first organization; and
a password that fails to be associated with the second organization.

12. A method for securely managing calendar across corporate boundaries, the method comprising:
transmitting a request for availability of a first user having a schedule maintained at a first calendar application maintained by a first corporate entity, the request being from a second user having a schedule maintained by a second calendar application maintained by a second corporate entity, the request being transmitted to a central trust management system that is configured to determine whether a trust relationship exists between the first corporate entity and the second corporate entity;
responsive to a positive determination by the central trust management system of the existence of a trust relationship between the first corporate entity and the second corporate entity, receiving availability information of the first user, said availability information being received by the second user;
generating a request to schedule a meeting of the first user by the second user, the generating being performed from the availability information of the first user;
transmitting to the central trust management system, the request to schedule a meeting of the first user by the second user;
transmitting to the central trust management system, security and identity information of the second user; and
receiving from the central trust management system, an indication of a meeting scheduled for the second user with the first user in accordance with the request to schedule a meeting;

wherein the central trust management system comprises a database application maintained on a third computer that includes trust information characterizing security and trust relationships between the first corporate entity and the second corporate entity.

13. The method of claim 12, wherein the central trust management system that is operable to determine whether a trust relationship exists between the first corporate entity and the second corporate entity further comprises:
a central trust management system that is operable to determine whether a trust relationship exists between the first corporate entity and a portion of the second corporate entity associated with the second user.

14. The method of claim 12, wherein the central trust management system that is operable to determine whether a trust relationship exists between the first corporate entity and the second corporate entity further comprises:
a central trust management system that is operable to determine whether a trust relationship exists between a portion of the first corporate entity associated with the first user and the second corporate entity.

15. The method of claim 14, wherein the central trust management system further comprises:
a password that fails to be associated with the first corporate entity; and
a password that fails to be associated with the second corporate entity.

16. The method of claim 12, wherein the availability of the first user further comprises:
an available time block of the first user.

17. The method of claim 12, wherein the availability of the first user further comprises:
a description of a scheduled event of the first user.

18. The method of claim 12, wherein the central trust management system further comprising:
a central authentication and authorization management system.

19. The method of claim 12, wherein the transmitting to the central trust management system, security and identity information of the second user further comprises:
transmitting to the central trust management system, security and identity information of the second user before transmitting a request for availability.

20. A system including a third computer in communication with a first computer and a second computer, the system further comprising:
a memory of the third computer on which is stored a database of trust information that internalizes security and trust relationships between a first user of a first organization and a second user of a second organization in regards to scheduling; and
a central trust manager maintained on the memory of said third computer configured to determine from the database of trust information whether a trust relationship exists between the first organization and the second organization, and configured to provide availability information from a first computer of the first user to a second computer of the second user, said availability information being provided in response to a positive determination that the trust relationship exists;
the central trust manager being configure to use security and identity information of the second user according to a security policy to determine whether the second user of the second organization is granted access to requested calendar data and configured to provide the requested calendar.

* * * * *